(12) United States Patent
Da Palma et al.

(10) Patent No.: US 8,296,139 B2
(45) Date of Patent: Oct. 23, 2012

(54) ADDING REAL-TIME DICTATION CAPABILITIES FOR SPEECH PROCESSING OPERATIONS HANDLED BY A NETWORKED SPEECH PROCESSING SYSTEM

(75) Inventors: William V. Da Palma, Coconut Creek, FL (US); Brien H. Muschett, Palm Beach Gardens, FL (US); Wendi L. Nusbickel, Boca Raton, FL (US); Ronald D. Swan, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/615,788

(22) Filed: Dec. 22, 2006

(65) Prior Publication Data

US 2008/0154593 A1 Jun. 26, 2008

(51) Int. Cl.
*G10L 15/00* (2006.01)
(52) U.S. Cl. .......... 704/235; 704/251; 369/25.01
(58) Field of Classification Search .......... 704/235, 704/251; 369/25.01
See application file for complete search history.

(56) References Cited

U.S. PATENT DOCUMENTS

| | | | |
|---|---|---|---|
| 6,173,250 B1 * | 1/2001 | Jong | 704/3 |
| 6,604,077 B2 * | 8/2003 | Dragosh et al. | 704/270.1 |
| 6,816,468 B1 * | 11/2004 | Cruickshank | 370/260 |
| 6,925,438 B2 * | 8/2005 | Mohamed et al. | 704/276 |
| 7,133,513 B1 * | 11/2006 | Zhang | 379/202.01 |
| 7,496,625 B1 * | 2/2009 | Belcher et al. | 709/204 |
| 2003/0212554 A1 * | 11/2003 | Vatland | 704/235 |
| 2006/0190250 A1 * | 8/2006 | Saindon et al. | 704/235 |
| 2007/0203708 A1 * | 8/2007 | Polcyn et al. | 704/270.1 |
| 2007/0239837 A1 * | 10/2007 | Jablokov et al. | 709/206 |
| 2009/0124272 A1 * | 5/2009 | White et al. | 455/466 |

OTHER PUBLICATIONS

"Crescendo releases state-of-the-art dictation, speech recognition application for Citrix access infrastructures", Enterprise Networks & Servers, Feb. 2006.
"Dragon MT Workflow System—Dragon MT Speech Server", Nuance Communications Inc., 2006.
"SRC—Digital Dictation—Server-Based Speech Recognition", SRC Co., 2005.
"VoiceWare Server 241", The Programmers' Consortium, Inc., 1999-2005.

* cited by examiner

*Primary Examiner* — Daniel Abebe
(74) *Attorney, Agent, or Firm* — Patents On Demand P.A.; Brian K. Buchheit; Scott M. Garrett

(57) ABSTRACT

The present invention can include a speech processing method for providing dictation capabilities to a voice server. The method can include a step of establishing a real-time voice communication session involving a voice interface. Speech for the communication session can be streamed to a remotely located voice server. A real-time stream of text can be received from the voice server. The stream of text can include text that has been speech-to-text converted by the voice server from the streamed speech. The voice server can use a MRCP based non-halting interface to receive the real-time stream of speech and a delivery interface to deliver real-time text to a designated endpoint.

20 Claims, 6 Drawing Sheets

ADDING REAL-TIME DICTATION CAPABILITIES FOR SPEECH PROCESSING OPERATIONS HANDLED BY A NETWORKED SPEECH PROCESSING SYSTEM

BACKGROUND

1. Field of the Invention

The present invention relates to the field of speech processing and, more particularly, to enhancing a networked speech processing system to add a real-time dictation capability.

2. Description of the Related Art

In speech processing, dictation can be a real-time process of converting live, free from speech (e.g., a conversion) into text. User's often want an ability to view the text in real-time, where the automatically generated text can be edited before being stored. Desktop speech processing solutions, such as ViaVoice, are able to perform dictation functions as described. These dictation functions require a user to explicitly activate/deactivate a dictation mode. When the dictation mode is active, software dedicated to dictation seizes (using a local application program interface (API) specifically designed for dictation) speech processing resources (i.e., a microphone, a speech recognition engine, and the like) for a duration of the dictation. When a user exits a dictation mode, the previously seized resources are released.

Networked speech processing systems, which concurrently handle speech processing tasks for multiple remote clients, currently lack a dictation ability. That is, no current networked speech processing system accepts a real-time audio input and produces real-time textual output that is presented prior to speech recognition completion. A few conventional networked systems have a transcription capability, which produces a transcription of speech input during a speech processing session. This transcription is not a real-time text stream, but is generated and provided upon session completion. Other existing networked systems permit client devices to send a sequential set of audio input files, each being processed (e.g., transcribed) to create textual output files, which are sent back to client device. These systems are effecting transcribing in a traditional manner, for a "virtual" session that consists of multiple sub sessions, each sub session consisting of processing an audio input file and producing a corresponding output files that is sent to a client. The client can automatically parse a transcription session into a two or more of sub sessions, each having an input file. The client can also concatenate output files received from two or more sub sessions to create a transcription for a full session consisting of the set of component sub sessions. Real-time performance is not possible with such a system. That is, conventional implementations of a file based remote transcription technology are unable to accept a real-time input stream of audio and produce real-time text output.

An inability of networked speech processing systems to perform dictation, which local speech processing is able to perform, relates to an underlying infrastructure of networked systems. In a typical networked system, a speech enabled application, often written in VoiceXML, interacts with a client or a user. The speech enabled application submits VoiceXML formatted speech processing requests to a voice server, which uses turn based speech recognition engines and/or speech synthesis engines to perform the processing tasks. A continuous dictation channel having dedicated resources does not exist. Further, a text output channel, which could be needed to present real-time textual output, is not present in conventional systems.

Further, a client microphone is continuously being turned on and off as new speech is detected using a speech activated technology. The speech activated technology results in some information loss, such as an initial portion of an audio utterance being clipped. Conventional networked speech processing systems have not been able overcome these problems and remain unable to perform real-time dictations for remote clients.

SUMMARY OF THE INVENTION

A networked speech processing solution having real-time dictation capabilities. That is, the solution describes a network, turn based speech processing environment capable of receiving a real-time stream of audio containing speech, speech recognizing this input, and presenting a real-time textual output to a text presentation interface as the audio input stream is processed. More specifically, the solution can create a first interface that causes a speech server to speech recognize a continuously stream of input. Commands can cause this continuous recognition to occur over this interface until an explicit command to stop recognition is conveyed (unlike traditional interfaces that automatically stop speech recognizing when a pause over a designation duration is detected). In other words, a special non-halting mode can be established for the first interface. A second interface can also be established that is associated with user designated endpoint (Uniform Resource Identifier or URI) that specifies a location to which real-time speech recognition results are to be provided. Through these two interfaces, a speech application server is able to provide real-time dictation results to a remotely located client. Appreciably, the real-time dictation can be performed in conjunction with other tasks in a non-interfering manner. For example, an automated speech response session (having real-time dictation output) can perform programmatic actions responsive to user input and can generate output for a user, as textual output for the automated communication session is being delivered to a text presentation interface in real-time.

The present invention can be implemented in accordance with numerous aspects consistent with material presented herein. For example, the present invention can include a speech processing method for providing dictation capabilities to a voice server. The method can include a step of establishing a real-time voice communication session involving a voice interface. Speech for the communication session can be streamed to a remotely located voice server. A real-time stream of text can be received from the voice server. The stream of text can include text that has been speech-to-text converted by the voice server from the streamed speech.

Another aspect of the present invention can include a dictation method for a networked speech processing system. In the method, a delivery endpoint can be received to which a real-time text stream is to be delivered. A text delivery interface can be established in a voice server, which links the voice server to the delivery endpoint. A non-halting interface can be opened in the voice server. A real-time stream of speech can be received via the non-halting interface. The real-time stream of speech can be continuously speech recognized to generate a real-time stream of text output. The real-time stream of text output can be continuously conveyed to the endpoint via the text delivery interface.

Yet another aspect of the present invention can include a voice server having a real-time dictation capability. The voice server can include an MRCP based non-halting interface which accepts a stream of speech that is continuously speech-to-text converted until an explicit stop processing message is received. The voice server can also include a text delivery interface configured to stream textual speech recognition results to a remote endpoint in real-time.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
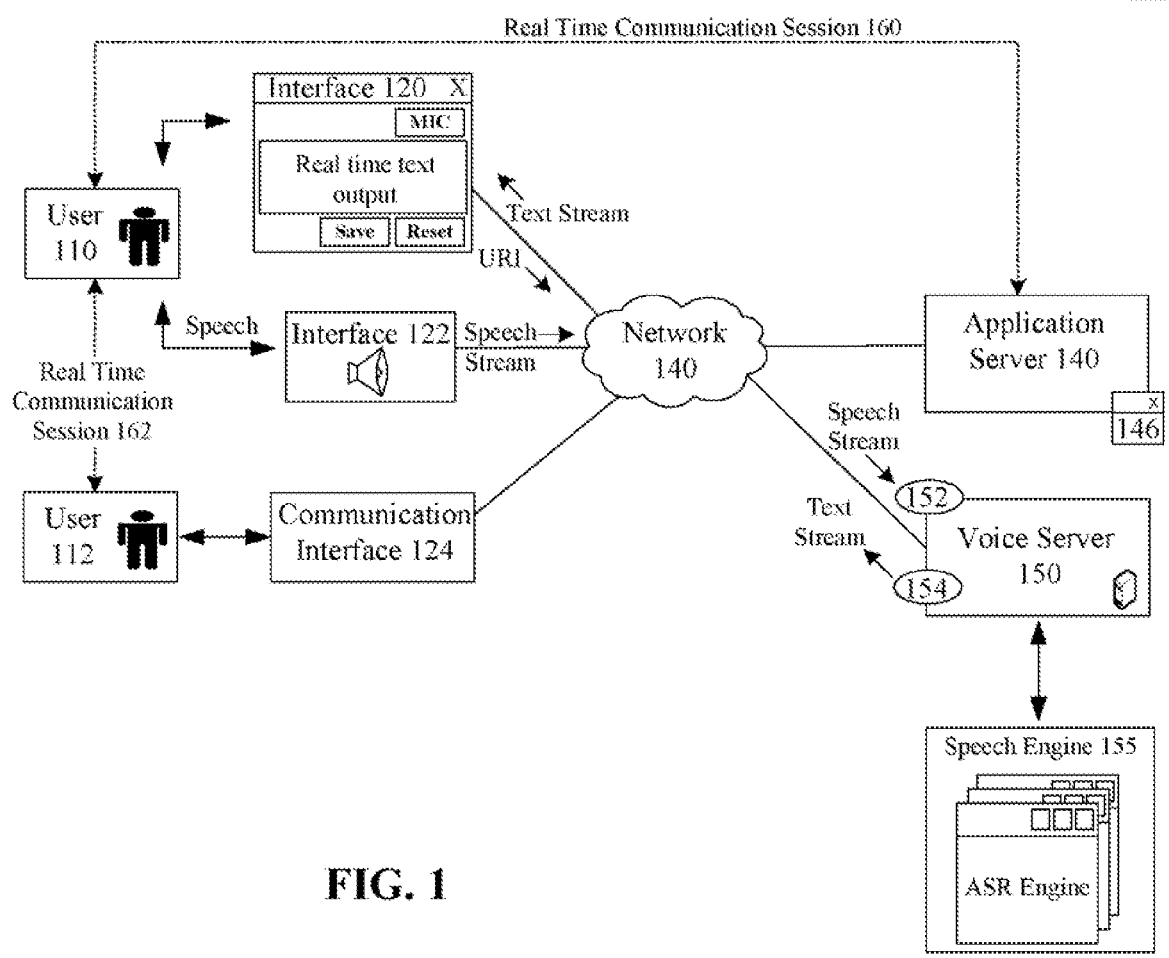
FIG. 1 is a schematic diagram of a networked speech processing system configured to perform real-time dictation in accordance with an embodiment of the inventive arrangements disclosed herein.

FIG. 1 is a schematic diagram of a networked speech processing system 100 configured to perform real-time dictation in accordance with an embodiment of the inventive arrangements disclosed herein. System 100 can include one or more communication devices utilized by user 110 to connect the user to network 140. A voice interface 122 and/or a text presentation interface 120 can be communication device interfaces through which the user 110 can interact. In one embodiment, the computing device associated with interface 120-122 can be a single multimodal device having both a text modality (interface 120) and a voice modality (interface 122). In another embodiment, multiple computing devices can be utilized by user 110, one (e.g., a phone) associated with the voice interface 122 and another (e.g., a computer having a data/text exchange interface 120).

A real-time stream of speech can be conveyed through the interface 122 over network 140 to a voice server 150. The voice server 150 can deliver corresponding real-time text stream over network 140 to interface 120. The text stream can include text-to-speech converted content from the speech stream. In one embodiment, the speech stream that is dynamically converted in real-time to the text stream can include only the half of a communication session associated with user 110 input. In another embodiment, the speech stream that is dynamically converted in real-time to the text stream can include content provided by every communicating party involved in the voice communication session.

In one embodiment, the communication session 160 can be between the user 110 and a speech enabled application 146 of an application server 140, such as an interactive Voice response system (IVR). In another embodiment, the communication session 162 can be between user 110 and another user 112, who is connected to network 140 using a communication interface 124.

Voice server 150 can include a non-halting interface 152, which is specifically configured for continual recognition. The interface 152 can inform the voice server 150 to continuously recognize the speech stream until explicitly notified to stop recognizing the stream. Appreciably, the voice server 150 can perform turn based recognitions using speech engines 155.

In one embodiment, interface 152 can be a Media Resource Control Protocol (MRCP) interface. For example a new header for MRCP can be created. The header can be used in request to the MRCP recognizer component of the voice server 150. The header can indicate a special mode non-halting of recognition, which does not stop recognizing speech until explicitly told to do so.

The text stream delivery interface 154 can connect interface 120 to the voice server 150. The voice server 150 can be conveyed a Uniform Resource Identifier (URI) or other identifier that specifies where speech processing results are to be conveyed. The text stream conveyed from interface 154 is a real-time stream (conveyed to interface 120 prior to session completion). Interface 154 can be configured so that is does not circumvent normal return results of the voice server 150, which are typically delivered once processing has completed. That is, the interface 154 represents an additional capability of voice server 150 and not a substitute for an existing capability.

In one embodiment, a header specific to interface 154 can be created. The header can specify the URI for the endpoint to which text is to be delivered in real-time. At present, an ability to send speech results to a client specified URI is outside the MRCP specification. Accordingly, interface 154 can use a protocol specified by the URI, such as Hypertext Transfer Protocol (HTTP) to convey the text stream to the designated endpoint.

Figure 2:
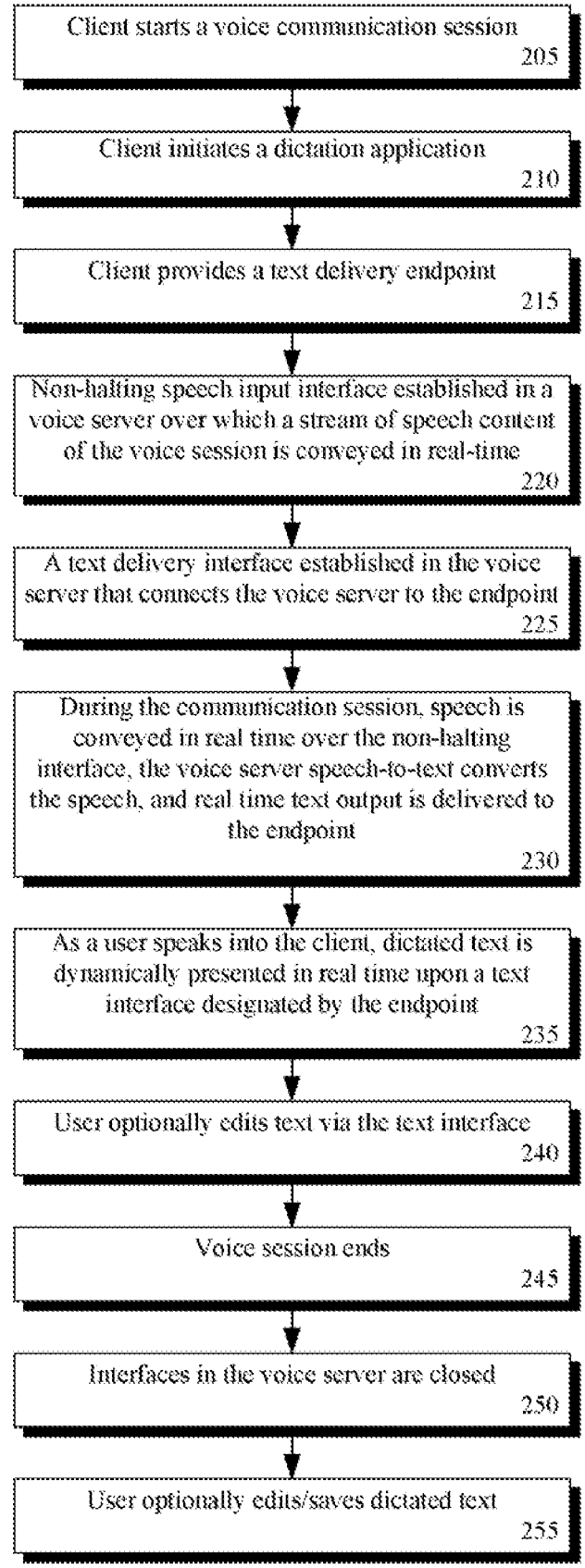
FIG. 2 is a flow chart of a method for performing dictation using speech processing resources of a networked speech processing system in accordance with an embodiment of the inventive arrangements disclosed herein.

FIG. 2 is a flow chart of a method 200 for performing dictation using speech processing resources of a networked speech processing system in accordance with an embodiment of the inventive arrangements disclosed herein. The method 200 can be performed in the context of system 100.

Method 200 can begin in step 205, where a client (e.g., phone or computer) having a voice (e.g., VoIP) communication interface can start a voice communication session. In step 210, the client can initiate a dictation application, which can be a VoiceXML application. In step 215, the client can provide a text delivery endpoint, to which real-time text output is to be conveyed. In one embodiment, the endpoint can be specified as a URI. In step 220, a non-halting speech interface can be established in the voice server over which a stream of speech content of the voice session can be conveyed in real-time. In step 225, a text delivery interface can be established that connects the voice server to the delivery endpoint.

In step 230, during the communication session, speech can be conveyed in real-time over the non-halting interface. The voice server can dynamically convert the input to text, which is delivered as a real-time output stream to the endpoint. In step 235, a user speaks into the voice communication interface, dictated text can be dynamically presented in real-time upon a text interface designated by the endpoint. In optional step 240, a user can choose to edit text presented in the text interface. In step 245, the voice session can end. In step 250, the interfaces of the voice server can be closed. In step 255, a user can optionally choose to edit/save the dictated text, which is presented in a text interface local to the user.

Figure 3:
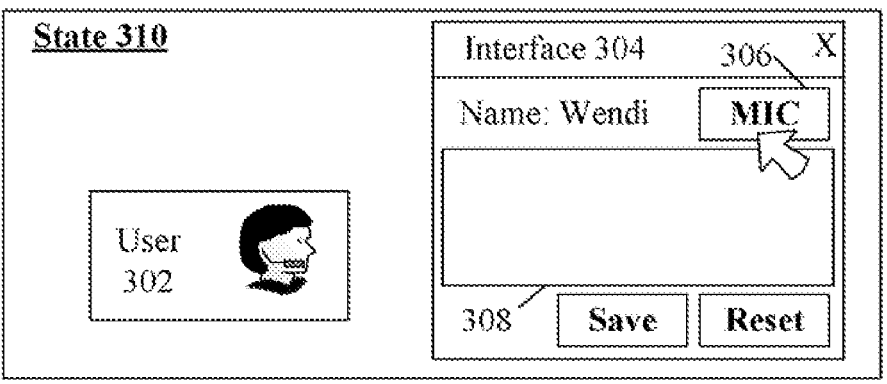
FIG. 3 is a use case example of a computing client using a networked speech processing system for dictation purposes in accordance with an embodiment of the inventive arrangements disclosed herein.
Figure 3:
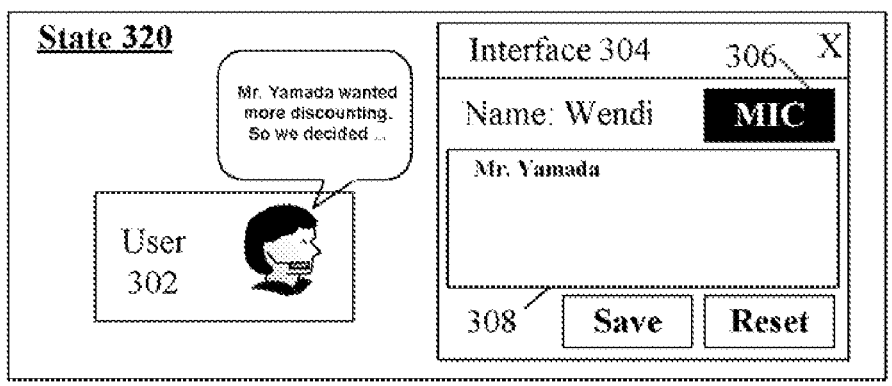
Figure 3:
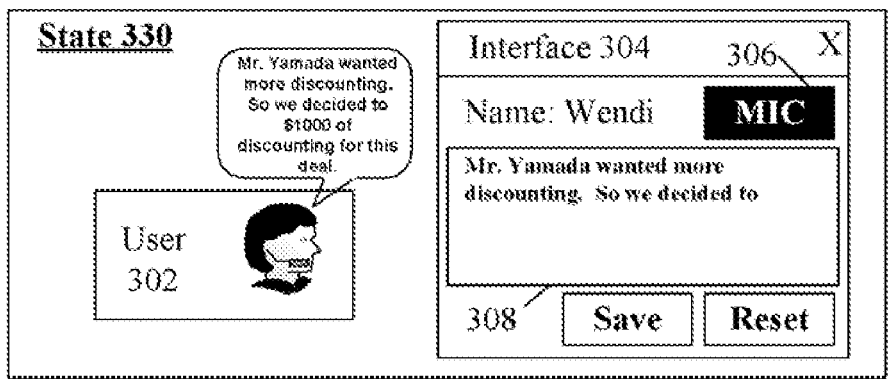
Figure 3:
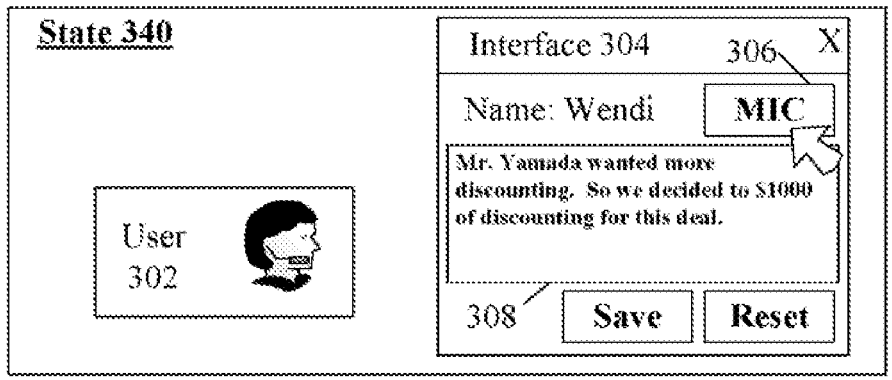

FIG. 3 is a use case example 300 of a computing client using a networked speech processing system for dictation purposes in accordance with an embodiment of the inventive arrangements disclosed herein. Example 300 can be performed in the context of system 100 or any similar system, such as one capable of performing method 200. A specific context, upon which example 300 is based is that of a call center agent using a personal computer. The call can be with a live user and dictation can be performed and presented in real-time. The dictation can include speech of the call center agent and speech of the live user, who is communicating with the agent. This example 300 represents just one of many contemplated scenarios to which the disclosed invention applies, and the invention is not to be construed as limited in this regard.

Example 300 includes a user 302 that locally utilizes a multi modal interface 304 that has a speech input and a text output modality. The multi modal interface 304 can be an interface of a computing device, such as a smart phone or a desktop computer. A microphone 306 can be activated within the interface 304, which initializes a dictation mode. A text output windows 308 can present text output, which has been speech-to-text converted by a networked speech processing system and delivered in real-time. Example, 300 shows four different time spaced states 310, 320, 330, and 340.

In state 310, a user can select microphone 306 option to active a real-time dictation capability of a networked speech processing system, to which the client that presets interface 304 is communicatively linked. Activating the microphone 306 can for example cause the networked speech processing system to enter a non-halting speech recognition mode that accepts and continuously processes a stream of speech input provided by the user 302. Further, an identifier for the interface 304 client (e.g., a URI) can be provided to the networked speech processing system to use as an endpoint to which a stream of real-time text (i.e., a stream of text resulting from speech recognizing the input) is presented.

In state 320, the user can start speaking, which results in text converted speech content dynamically and automatically appearing in the text output window 308. As used herein, the text of output window 308 can be received in units of words or phrases, depending upon settings established for the networked speech processing system. State 330 shows that as user 302 speaks "we decided" which is part of the input stream, the work "we" can dynamically appear in the window 308 of interface 304 before the user 302 finishes speaking the word "decided". State 340 shows that a user can click the microphone 306 option to end the dictation session. Throughout the interaction, user 302 is able to dynamically edit text presented within window 308. The text can also be edited, saved, reset, and otherwise manipulated after the dictation session is deactivated.

Figure 4:
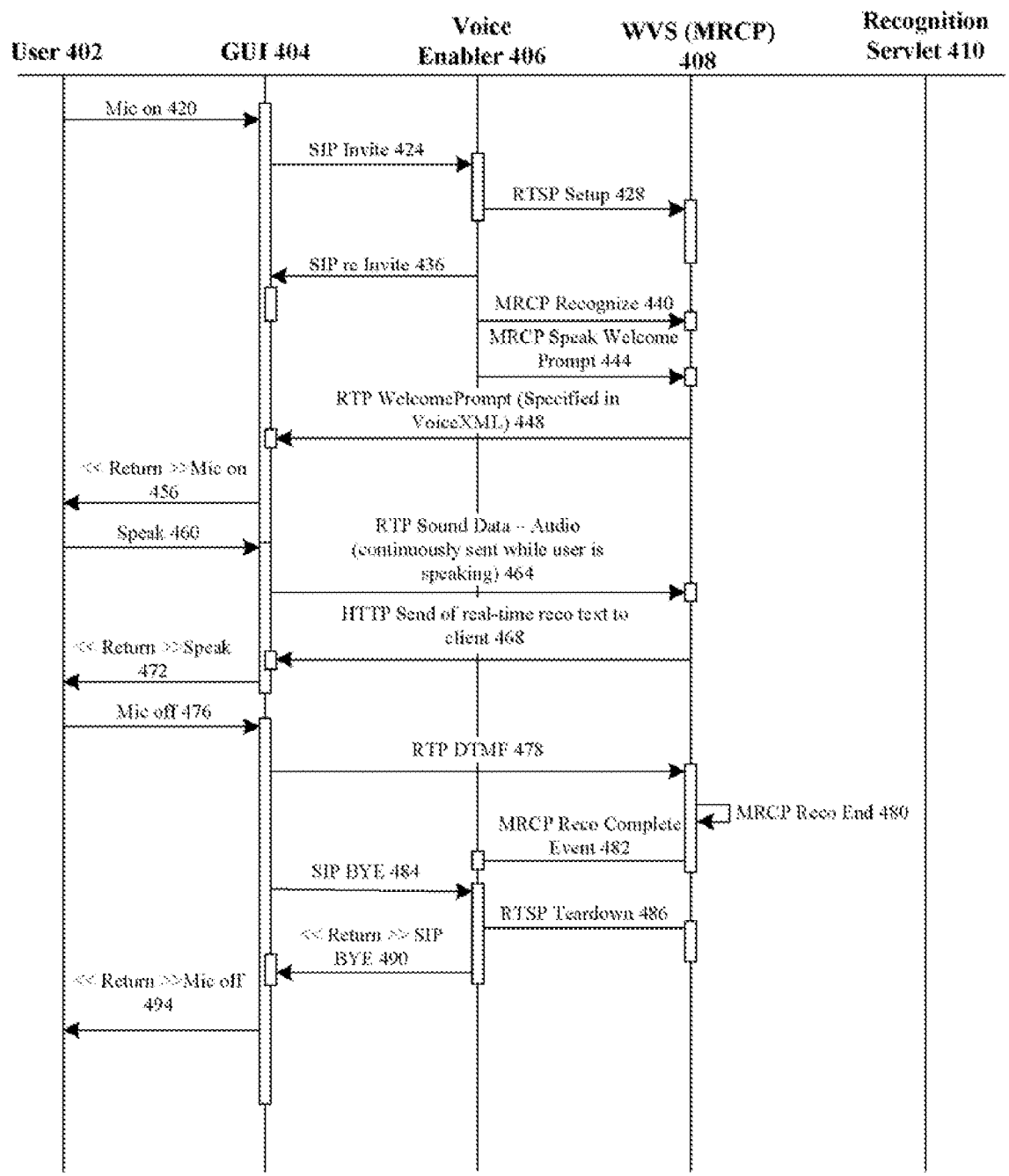
FIG. 4 is a sequence flow for the use case shown by the client computing example.

FIG. 4 is a sequence flow 400 for the use case shown by example 300. The flow can include a user 402, a graphic user interface (GUI) 404, a voice enabler 406, a voice server 408, and a servlet 410. The user 402 can provide a real-time stream of speech input. The GUI 404 can be part of a client device used by user 402. The voice enabler 406, voice server 408, and servlet 410 can each be components of a networked speech processing system.

Flow 400 can begin when the user 402 turns on a microphone (i.e., user clicks a button on GUI 404 to activate a microphone. A MIC ON 420 event can be initiated, which results in a SIP INVITE command 424 being conveyed from GUI 404 to voice enabler 406. The voice enabler 406 can respond back to the INVITE 424 by reporting that no real time protocol (RTP) ports have been established (yet). The voice enabler's Call Control eXtensible Markup Language (CCXML) interpreter can start processing the CCXML application. It can encounter a voice dialog and can start the VoiceXML interpreter. The VoiceXML interpreter can process the VoiceXML application. The VoiceXML interpreter can issue a Real Time Streaming Protocol (RTSP) SETUP 428 message to the voice server for speech.

A RTP open task can be performed where the voice server 408 performs the RTSP SETUP, which includes allocation of RTP ports. The voice server 408 can report these ports back to the voice enabler 406 in the Session Description Protocol (SDP) of RTSP SETUP 428 response. GUI 404 can receive a SIP re INVITE 436 from the voice enabler 406. An RTP open GUI action can open up an RTP sender, giving it the voice server 408 RTP port.

In the VoiceXML application, the voice enabler 408 can encounter a welcome prompt with a defined VoiceXML property named recognition mode. The recognition mode property can be set to equal dictation. The voice enabler 406 can issue a MRCP RECOGNIZE request 440 to the voice server 408 giving the voice enabler 406 a parameter setting a recognition mode to dictation and to vendor specific recognition real-time result, Uniform Resource Identifier (URI) parameters. The URI parameters can indicate where the voice server 408 is to send real-time text recognition results. Protocol for the URI can be HTTP.

The voice enabler 406 can send 444 a text-to-speech (TTS) prompt in the VoiceXML application to the voice server 408 for synthesis. An MRCP synthesizer resource and a speak request can be used. The voice server 408 can synthesis the speak request, and send the synthesized TTS prompt to the GUI 404 RTP endpoint. The GUI 404 RTP client can receive the audio output from the voice server 408. That is, the GUI 404 can be informed 448 via a trigger that the voice server 408 is now listening. (i.e., the microphone on request has successfully completed). The microphone on operation can end in a successful manner. A visual indication on the GUI 404 can show 460 the user 402 that the user may begin speaking and that active real-time dictation capabilities have been enabled.

User 402 can begin speaking 460, such as through a microphone of the client device. The GUI 404 can send 464 RTP (sound) data to the voice server 408. The voice server 408 can send 468 partial recognition text results to the client 303 previously specified (440) by a URI using an HTTP protocol. Steps 464-468 can repeat until user 402 stops speaking 372 and terminates 476 the dictation session, such as by clicking on a GUI 404 button to end dictation. When the dictation session ends, the GUI 404 can send 476 a message to this effect to the voice server 408. For example, a Dual Tone, Multi-Frequency (DTMF) key and payload message can be conveyed. Receipt of the DTMF message can cause the recognizer internal to the voice server 408 to send 478 an end recognition message down a recognition stack. The voice server 408 can fire a recognition complete event, which is detected 482 by the voice enabler 406.

A SIP BYE message can be sent 484 from the GUI 404 to the voice enabler 406 after the speech RTP has been send to the voice server 408. The voice enabler 406 can send an MRCP STOP command to the voice server 408. The voice enabler 406 can send 486 a RTSP TEARDOWN message to the voice server 408. The voice server 408 can close the RTP ports. The voice enabler 406 can return 490 an OK indication related to the SIP BYE request to the GUI 404. The GUI 404 can close the RTP ports and turn off the microphone. A microphone off indication can be presented 494 to the user 402.

Figure 5:
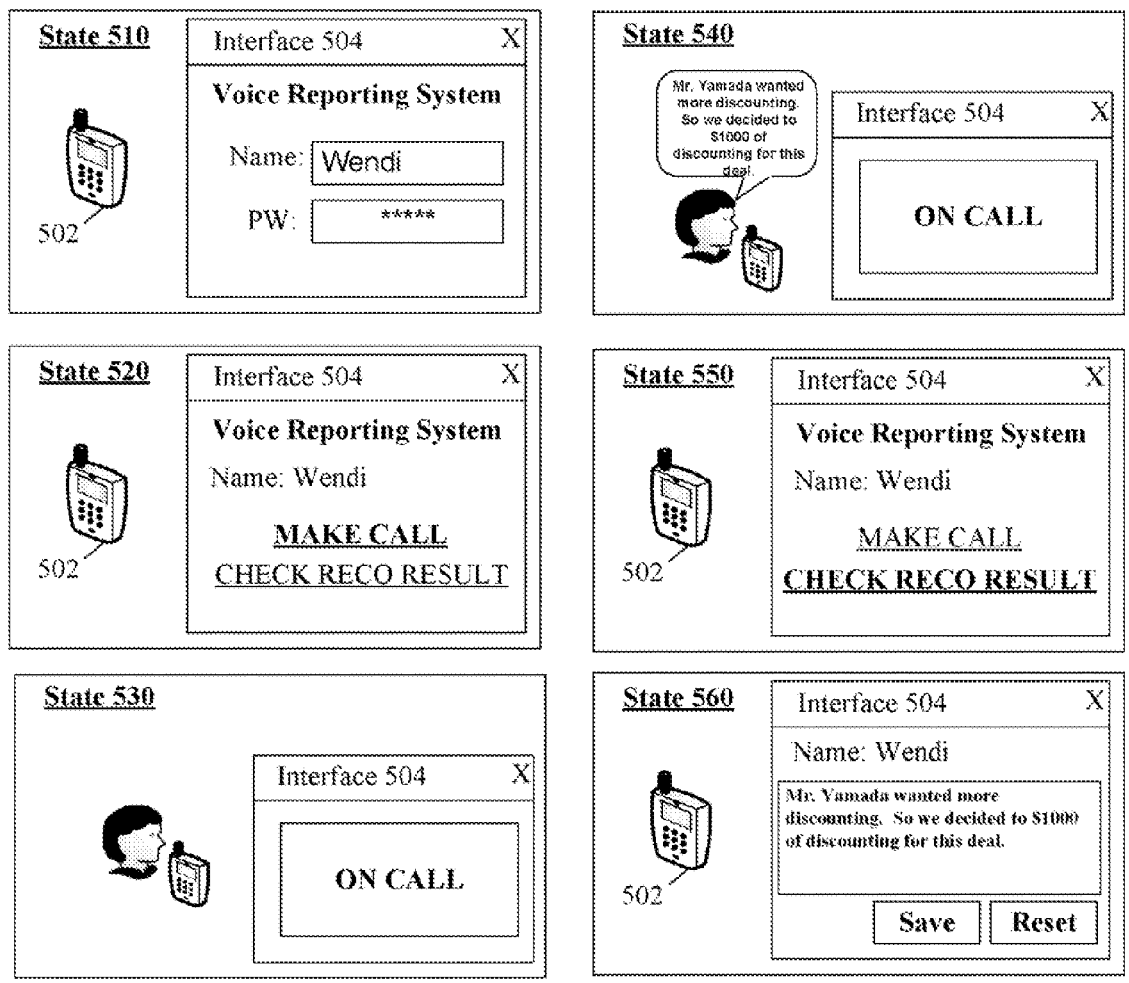
FIG. 5 is a use case example of a mobile telephone using a networked speech processing system for dictation purposes in accordance with an embodiment of the inventive arrangements disclosed herein.

FIG. 5 is a use case example 500 of a mobile telephone using a networked speech processing system for dictation purposes in accordance with an embodiment of the inventive arrangements disclosed herein. Example 500 can be performed in the context of system 100 or any similar system, such as one capable of performing method 200. A specific context, upon which example 300 is based, is a telephony conversation between two live users. The invention is not to be limited in this regard, and other arrangements are contemplated. In a different embodiment, for example, a user of the mobile telephone can receive dictation results during an interaction with an automated voice response system. The dictation results can be conveyed to any reference-able device having text output capability and need not be the same device that receives voice input.

Example 500 includes a mobile telephone 502 having a Web interface 504 and a voice interface 506. In one embodiment, both interfaces (504 and 506) can utilize the same transceiving components, such as components recognize to the voice server, creating a data channel (assuming that voice interface 506 is a Voice over Internet Protocol (VoIP) interface). Other embodiments of the invention permit a multimodal device 502 to concurrently utilize multiple different transceivers and/or can present textual output to a different device than mobile telephone 502.

In state 510, a user can use a Web interface to log into a dictation system. At this time, the user can specify (i.e., provide a URI for) an output device that is to receive real-time text output of text converted speech. In state 520, a user can use interface 504 to initialize a voice communication session, such as a VoIP session. In state 530, a user can be optionally presented with a welcoming prompt and can subsequently start speaking. In state 540, after the user ends the voice communication session (e.g., hangs up) speech recognition processes can be stopped. In state 550, the user can be presented an option via the interface 504 to receive speech recognition results from the voice communication session. State 560 shows a sample interface screen that can be presented dot the user 502 who selects the option to view textual results of the voice session. The user can optionally use phone keypad and other input abilities to modify the presented text as desired.

Appreciably, it is contemplated that the text results be presented in real-time, such as to a party communicating with user 502. Thus, it is contemplated that textual output be concurrently presented in real-time to multiple different clients, each having a text output interface. Further, when concurrent output sources are used, each can be interactively linked so that edits performed by a user at either end can dynamically appear in the corresponding users interface. Any of a variety of document collaboration technologies can be included to permit versioning control, change tracking, and the like.

Figure 6:
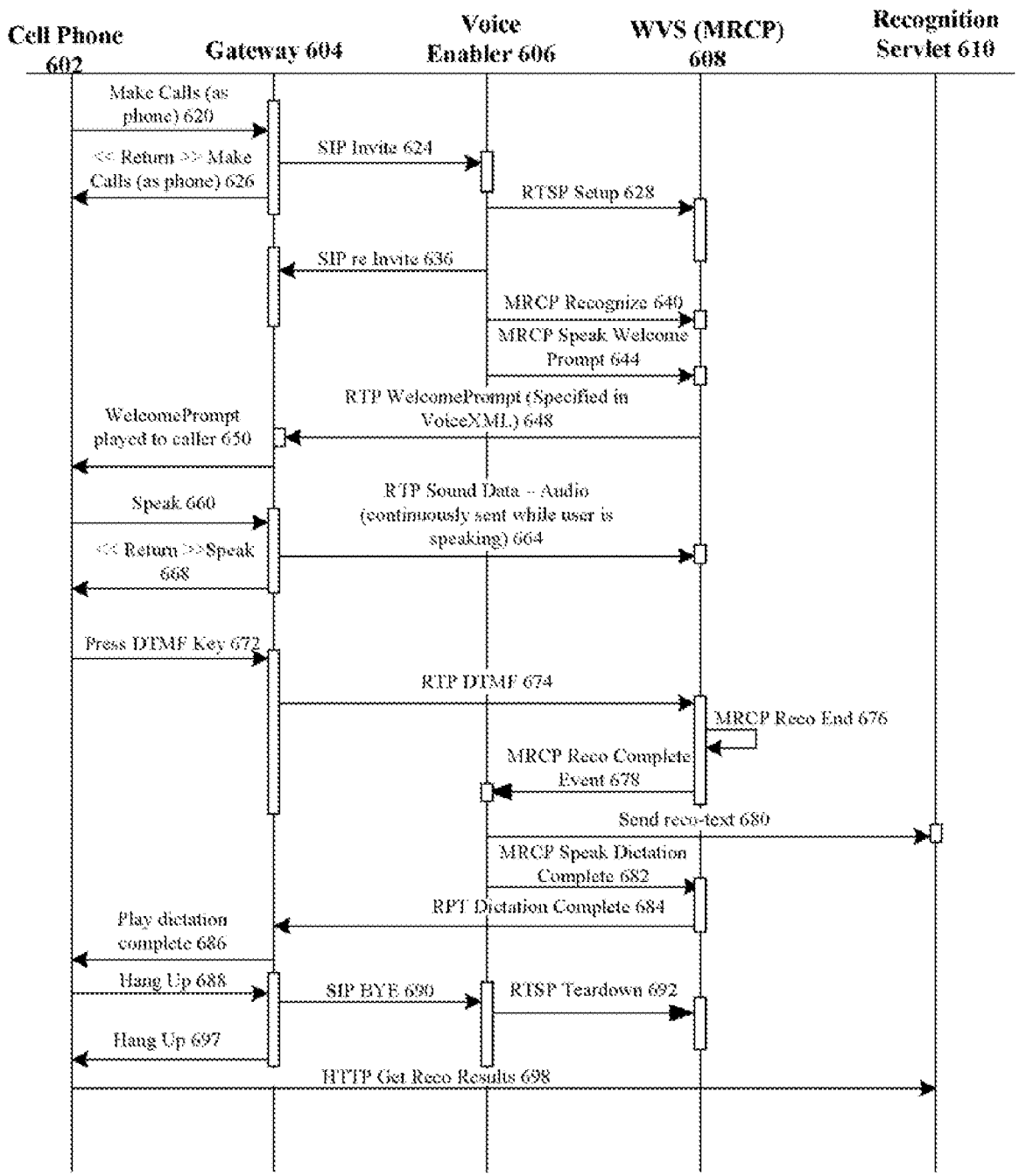
FIG. 6 is a sequence flow for the use case shown by the mobile telephone example.

FIG. 6 is a sequence flow 600 for the use case shown by example 500. The flow can include a cell phone 602, a gateway 604, a voice enabler 606, a voice server 608, and a servlet 610.

Flow 600 can begin with a user of the cell phone 602 calling 620 a number associated with a dictation service. The call can be answered by gateway 604, which can be a VoIP gateway. The gateway 604 can be configured to call a SIP dial peer, such as the voice enabler 606. The gateway 604 can issue 624 a SIP INVITE request to the voice enabler 606. The voice enabler 606 can respond back to the INVITE request with a no RTP port availed (yet) for the voice server 608 message. The make call request can then end 626.

The voice enabler's 606 CCXML interpreter can start processing the CCXML application. It can encounter a voice dialog and start a VoiceXML interpreter. The VoiceXML interpreter can process an associated VoiceXML application. The VoiceXML interpreter can issue 628 an RTSP SETUP message to the voice server 608 for speech. The voice server 608 can perform a RTSP SETUP operation that allocates RTP ports. The voice server 608 can report these ports back to the voice enabler 606 in the SDP of the RTSP SETUP response.

The voice enabler 606 issues 636 a SIP re INVITE to the VoIP gateway 604 with RTP portions reported by the voice server 608. The gateway 604 opens up an RTP sender, giving it to the voice server RTP port and a port receive RTP from the voice server 608. In the VoiceXML application, the voice enabler 606 can encounter a welcome prompt with a VoiceXML recognition mode property that indicates a dictation mode. The voice enabler 606 can issue 640 an MRCP RECOGNIZE request that passes an indicator setting the recognition mode to dictation.

The voice enabler 606 can send 644 a TTS prompt in the VoiceXML application to the voice server 608 for synthesis using the MRCP resource and the speak request. The voice server 608 can synthesis the SPEAK request, send 648 the synthesized TTS prompt to the gateway 604 RTP endpoint. The gateway 604 can audibly present 650 the prompt content over the phone 602 to a user. The user can hear the prompt. The prompt can tell the user that the user can begin a session with real-time dictation enabled whenever the user wants.

The user can then begin speaking 660 into the phone 602. The gateway 604 can spend 664 RTP (sound) data to the voice server 608. The caller can specify a real-time URI. The voice server 608 can stream recognition text words to the real-time URI as the words are received back from the recognition engine. An application author can choose between a receipt of the dictation recognition words in real-time or when the dictation completes. The flow 600 shows a scenario matching example 500, where dictation is returned when dictation completes. The flow can be modified in a manner similar to flow 400 in an embodiment where dictated text is returned in real-time. Steps 660 and 664 can occur repetitively. A speech can end in step 668.

Once a caller stops speaking, the caller can select 672 a DTMF key of other similar command to indicate that the dictation is done. This informs the voice server 608 that recognition is complete, so that the voice server 608 can send a recognition complete event to the voice enabler 406. The DTMF key and payload message can be sent 674 to the voice server 608. The receipt of the DTMF message can cause the recognizer to send 676 an end recognition message down the recognition stack, which occurs internal to the voice server 608. A recognition complete event can then be sent 678 from the voice server 608 to the voice enabler 606. The voice enabler 606 can send 680 a final, complete recognition complete event text to the VoiceXML application URI. The Voice enabler 606 can send 682 a TTS prompt in the VoiceXML application to the voice server 608 for synthesis using the MRCP synthesizer resource and the SPEAK request. The voice server 608 can synthesis the SPEAK request, can send 684 the synthesis TTS prompt to the gateway 604 RTP endpoint. The gateway 604 can then present 686 audio over the phone 602 to the phone user.

The caller can hang up 688 the telephone, which results in the gateway 604 receiving a notification. The gateway 604 can send 690 a SIP BYE message to the voice enabler 606. The voice enabler 606 can send an MRCP STOP message to the voice server 608 for the recognition request. The voice enabler 606 can then send 692 can MRCP TEARDOWN message to the voice server 608. The voice server 608 can close the RTP ports. The gateway 604 can close the RTP ports. The HANGUP task can end 697. The user of the phone 602 can issue 698 an HTTP request to get recognition results that were earlier saved by the voice enabler 606.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that is carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A speech processing method comprising:
   establishing a real-time communication session between a first client device and a second client device located remotely from the first client device, the real-time communication session involving a voice interface at the first client device;
   streaming speech during the real-time communication session from the first client device to a remotely located voice server via the voice interface;
   sending an endpoint identifier from the first client device to the voice server which identifies the second client device;
   converting the streamed speech from the first client device to a real-time stream of text at the voice server as the streamed speech arrives at the voice server during the real-time communication session;
   streaming the real-time stream of text from the voice server to the second client device in real time during the real-time communication session; and
   displaying the real-time stream of text at the second client device, as the real-time stream of text is received by the second client device during the communication session.

2. The method of claim 1, wherein the real-time stream of text conveys textual units to a remotely located endpoint immediately after each unit is speech-to-text converted, wherein the unit includes at least one of per-word processing unit and per-phrase processing unit.

3. The method of claim 1, wherein the real time communication session is between two parties who both produce speech, and the streamed speech includes speech for both of the two parties.

4. The method of claim 1, wherein the identifier includes a uniform resource identifier (URI) and wherein the protocol used for the real-time text stream is hypertext transfer protocol (HTTP).

5. The method of claim 4, further comprising:
   establishing a special text delivery interface, wherein the real-time text stream is conveyed from the text delivery interface.

6. The method of claim 1, further comprising:
   establishing a media resource control protocol (MRCP) based non-halting interface, wherein the speech stream is delivered to the voice server via the non-halting interface, wherein said voice server continues recognition upon input received via the non-halting interface until a stop message is received.

7. The method of claim 1, wherein the voice interface is an interface of a telephone, and wherein the real-time stream of text is delivered to a Web interface of the second client device, wherein the second client device is a computing device other than a telephone.

8. The method of claim 1, wherein the voice interface is a VoIP based interface, and wherein the real-time stream of text is delivered to a text interface of the second client device.

9. The method of claim 1, wherein the voice server is a VoiceXML server that utilizes a cluster of speech recognition engines, which concurrently perform speech recognition operations for a plurality of clients.

10. A dictation method for a networked speech processing system comprising:
    receiving, from a client device at a voice server, a delivery endpoint identifier identifying a delivery endpoint to which a real-time text stream is to be delivered from the voice server during a real-time communication session between a first user associated with the client device and a second user using a remote device, wherein, the delivery endpoint is not the client device or the remote device;
    establishing a text delivery interface in a voice server linking the voice server to the delivery endpoint, preformed responsive to receiving the delivery endpoint identifier;
    opening a non-halting interface at the voice server, preformed responsive to receiving the delivery endpoint identifier;
    receiving a real-time stream of speech via the non-halting interface from the client device during the real-time communication session, including speech of both the first and second users;
    continuously speech recognizing the real-time stream of speech during the real-time communication session to generate a real-time stream of text output; and
    continuously conveying the real-time stream of text output to the delivery endpoint via the text delivery interface during the communication session.

11. The method of claim 10, wherein the non-halting interface is a media resource control protocol (MRCP) based interface.

12. The method of claim 10, wherein the real-time stream of speech is processed on a word-by-word basis so that the real-time stream of textual output conveys a textual conversion of a word contained in the stream of speech as the following word in the stream of speech is processed by the voice server.

13. The method of claim 10, wherein the real-time stream of speech is processed on a phrase-by-phrase basis so that the real-time stream of textual output conveys a textual conversion of a phrase contained in the stream of speech as the following phrase in the stream of speech is processed by the voice server.

14. A voice server comprising:
a real-time dictation capability wherein the voice server receives a real-time stream of speech from a first remotely located voice interface having a first identifier, speech-to-text converts the speech, and delivers a real-time stream of textual output to a second remotely located text interface having a second identifier, wherein the second identifier is provided to the voice server by the first remotely located voice interface prior to commencement of the real-time stream of speech, wherein the real-time stream of speech includes speech first and second remotely located voice interfaces while engaged in a conversation during a real-time communication session, and wherein the real-time stream of textual output is delivered during the real-time communication session.

15. The voice server of claim 14, wherein the voice server is a VoiceXML server that utilizes a cluster of speech recognition engines, which concurrently perform speech recognition operations for a plurality of clients.

16. The voice server of claim 14, wherein the voice server receives a real-time stream of speech including speech of at least two parties involved in a real time conversation.

17. The voice server of claim 16, wherein the real-time dictation utilizes a media resource control protocol (MRCP) based speech recognition mode, which directs the voice server to process speech input from the real-time stream of speech until a stop processing message is received.

18. The voice server of claim 14, wherein the real-time dictation capability is utilized concurrently with other voice server capabilities in a non-interfering manner that does not circumvent a normal return of results produced when the voice server has completed processing input.

19. The voice server of claim 14, further comprising:
a media resource control protocol (MRCP) based non-halting interface which accepts a stream of speech that is continuously speech-to-text converted until an explicit stop processing message is received.

20. The voice server of claim 14, further comprising:
a text delivery interface configured to stream textual speech recognition results to the remotely located text interface in real-time, and wherein the second identifier is a uniform resource identifier (URI) of the remotely located text interface.

* * * * *